US005558376A

United States Patent [19]

Woehl

[11] Patent Number: 5,558,376

[45] Date of Patent: Sep. 24, 1996

[54] LOW PROFILE SWIVEL ADAPTERS

[75] Inventor: Roger Woehl, Rohnert Park, Calif.

[73] Assignee: Engineered Transitions Co., Inc., Healdsburg, Calif.

[21] Appl. No.: 397,874

[22] Filed: Mar. 2, 1995

[51] Int. Cl.[6] .......... F16L 55/00

[52] U.S. Cl. .......... 285/91; 285/92; 285/119; 285/276; 285/282; 285/907

[58] Field of Search .......... 285/907, 276, 285/281, 282, 91, 92, 119

[56] References Cited

U.S. PATENT DOCUMENTS

| | | | |
|---|---|---|---|
| 7,251 | 8/1876 | Caswell | 285/281 |
| 738,276 | 9/1903 | Wates | 285/276 X |
| 2,443,993 | 6/1948 | Schenkelberger | 285/276 X |
| 4,113,288 | 9/1978 | Cox | 285/276 X |

*Primary Examiner*—Dave W. Arola
*Attorney, Agent, or Firm*—Howard L. Rose

[57] ABSTRACT

A low profile swivel coupling having a main body with a hollow cylindrical bearing surface, a front swivel member internally threaded to be screwed onto a threaded bearing seated on the bearing surface and rotatable on it whereby the front swivel member rotates about bearing surface of the main body.

7 Claims, 3 Drawing Sheets

LOW PROFILE SWIVEL ADAPTERS

FIELD OF THE INVENTION

The present invention relates to a swivel adapter for cables and more particularly to a low profile swivel adapter for electric cables.

BACKGROUND OF THE INVENTION

Electrical cable connections in high vibration and flexing environments are subject to failure far more often than connections in less hostile environments. Further, such connections, where the cable lies at a relatively sharp angle at some point along its length, are subject to even greater rates of failure.

An example of such a hostile environment is the supply of current to the deicers on the tail rotor of certain helicopters. An example of an existing structure is illustrated in FIG. 1 of the accompanying drawings. The current to the deicers is carried on a cable 2 from the main body of the helicopter 4 to a slip ring 6 mounted on the tail rotor. Supply to the slip ring is via the usual brush structure 10.

It is noted that a sharp bend 8 is provided in the cable 2 to absorb some of the vibration by permitting flexure of the cable. As indicated above such a construction greatly reduces the life of the cable requiring frequency inspection and replacement.

OBJECTS OF THE INVENTION

It is an object of the present invention to reduce the damage to electrical cables in high vibration and flexing environments by the use of a swivel in the physical connection between an electrical cable connected to a source of high vibration.

Another object of the present invention is to provide a low profile swivel adapter for cables to permit controlled rotation of a cable subjected to high rotational forces.

Still another object of the invention is to provide a low profile swivel connector for cables permitting limited rotation of the cable about its central axis while providing a moisture seal between the parts rotatable relative to one another.

Yet another object of the present invention is to provide a swivel adapter for electrical cables terminating in an electrical connector wherein the diameter of the swivel adapter is no greater than the diameter of the electrical connector.

It is still another object of the present invention to provide a low profile swivel adapter wherein the two halves of the swivel overlap to provide the low profile and are held together by a threaded retaining bearing that not only serves to hold the two halves of the swivel together but also serves as a thrust bearing to support both end and side thrust thereby extending the life of the structure without greatly affecting the diameter of the structure.

BRIEF DESCRIPTION OF THE PRESENT INVENTION

The present invention provides a low profile swivel connector for cables, preferably, but not necessarily, electrical cables, subjected to high vibration forces whereby the effects of vibration are restricted to limited rotation of the cable about its longitudinal axis. The length of the cable subject to rotation can be selected in accordance with the requirements of its environment as well as the degree of rotation permitted. Subject only to this limitation the connector is quite short in length.

The cable extends from a stable platform into a sidearm lying at a preselected angle to the length of the cable that will be subjected to vibrational forces. The cable is rigidly held in the sidearm, enters a main body of the connector at a preselected angle where a generally U-shaped bend is developed in the cable and then extends along an essentially linear path to a connection to the vibrating body. The material gathered in the generally U-shaped bend helps to safely absorb some of the vibration effects.

In the case of an electrical supply to the deicers on the blades of the tail rotor of a helicopter the cable extends from the sidearm along the centerline of the swivel connector to the an electrical connector that is coupled to a transition member interposed between the electrical connector and a slip ring on the tail rotor of the helicopter. A coupling between the electrical connector and the sidearm provides a joint permitting any desired degree of rotation of up to 330° of the electrical connector relative to the main body of the connector. The cable extending between these two points is oscillated periodically about its elongated or central axis, thus assisting in absorbing the vibrations in a controlled manner that is far less destructive than the present method of absorbing vibration as illustrated in FIG. 1.

An important feature of the invention is the provision of a threaded retaining bearing that couples the stationary main body of the swivel to an internally threaded front member that is to be rotatable relative to the main body. The front member is threaded onto and secured to the threaded retainer bearing which is precisely dimensional to fit on a bearing surface on the main body so that there is substantially no play between these members. This coupling provides the rotation of the latter member to the main body. The precise dimensions of the retainer bearing relative to the bearing surface permits the bearing to be able to accommodate both side and end thrust loading. The main body of the swivel is aluminum with a nickel Teflon® plating and the bearing is a plastic insuring long life of the swivel without requiring lubrication of the relatively rotatable surfaces.

The above and other features, objects and advantages of the present invention, together with the best means contemplated by the inventor thereof for carrying out the invention will become more apparent from reading the following description of a preferred embodiment and perusing the associated drawings in which:

DETAILED DESCRIPTION OF THE PRESENT INVENTION

Figure 2:
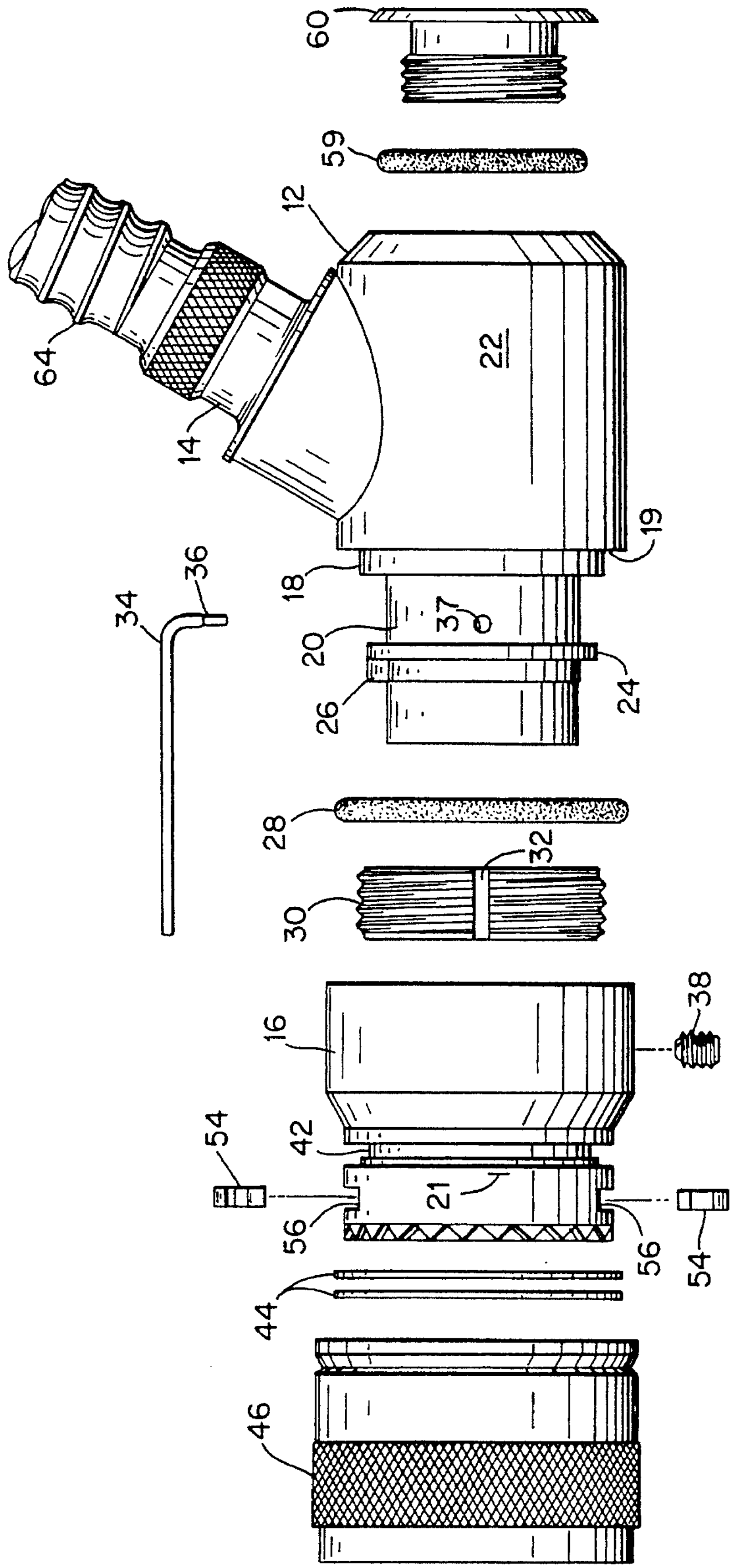
FIG. 2 is an exploded side view of the low profile swivel of the present invention.

Referring specifically to FIG. 2 of the accompanying drawings a hollow cylindrical swivel adapter body 12 has a hollow cylindrical sidearm 14 lying at an obtuse angle to the adapter body 12. A hollow cylindrical swivel front end 16 is adapted to be rotatable attached to the adapter body 12. The adapter body 12 has a shoulder 18 of reduced diameter and a bearing groove 20 extending in that order away from a main region 22 of the adapter body into which the sidearm 14 extends. Continuing away from the main region 22, there is a retaining shoulder 24 and a swivel stop 26, the latter constituting an arcuate body that cooperates with an interior swivel stop in the swivel front end 16 to limit rotation of the swivel front end.

An O-ring 28 seats on O-ring surface or shoulder 18 to provide an environmental seal between members 12 and 16, as becomes apparent subsequently. A threaded retainer bushing 30 is employed to rotatably secure the swivel front end to the swivel adapter body 12. A split groove 32 in the bushing 30 allows it to be expanded to fit over the retaining shoulder 20 and contract so as to be seated on the bearing groove 20 about which it is free to rotate.

The swivel front end 16 is internally threaded and is to be threaded onto the bushing 30. Initially, the swivel front end 16 is slipped over the left end, as viewed in the Figure, of the swivel adapted body and bought up against the bushing 30. A tool 34 having a right angle member 36 is inserted through the hollow body 12 and the short right angle member 36 is inserted through a hole 37 extending through the bearing groove surface from the interior of the body 12 and into the split 32 in the retainer bushing 30. In consequence the retainer bushing 30 cannot rotate and the swivel front end 16 may be threaded onto the bushing 30. The O-ring previously seated on the surface 18 is now seated interiorly of the swivel front end to provide an environmental seal. A set screw 38 is threaded into the swivel front end 16 and seats in the groove 32 of the bushing 30 so that the swivel front end cannot back off of the bearing. It should be noted that over half of the axial length of the front end overlaps the main body thus contributing to the desired short length of the swivel structure.

Specifically, the right end of the swivel front end 16 engages an annular transverse surface 19 so that the front end overlaps the main body substantially to a mark 21 on the front end.

Figure 5:
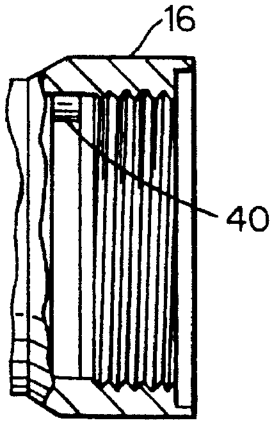
FIG. 5 illustrates the interior of the front swivel member.

The interior of the swivel front end to the extent important to operation of the swivel is shown as a breakaway in FIG. 5. The interior of the front end is threaded at 39 and has an interiorly extending arcuate inward projection 40 that cooperates with the swivel stop 26 of the main body 12 to limit rotation of the front end 16 to less than 360°; about 330° in most instances. In this manner the cable cannot be damaged by winding up to a point of rupture.

To complete the overall structure of the swivel adapter, the front end 16 has an annular recessed surface 42 adapted to receive two retaining rings 44 that when seated in an interior groove in a knurled coupling ring 46 completes the rotatable end of the swivel. The coupling ring 46 is shown with a broken away section to expose a portion of its interior. The interior has an inwardly sloping annular surface 48 terminating in a recessed annular slot 50 so that when the coupling ring 46 is pressed against the front end 16 the retaining rings are compressed and subsequently snap into the slot 50. The ring may be rotated about swivel front end 16 so that, and reference is made to FIG. 3 of the accompanying drawings, the coupling ring may be threaded onto the back of an electrical connector 52 to which the cable is terminated.

Referring again to FIG. 2, the swivel front end 16 has opposed lock springs 54 seated adjacent the front (left end as viewed in FIG. 2) of the swivel front end. Kerfs 56 are cut transverse of the axis of the front end in which the springs 54 are seated. These springs mate with teeth 58 formed interiorly of the knurled coupling 46. The spring and tooth coupling arrangement is disclosed in assignee's U.S. Pat. Nos. 4,793,821 and 4,834,667 and the material relating to the spring teeth is incorporated herein by reference.

Figure 1:
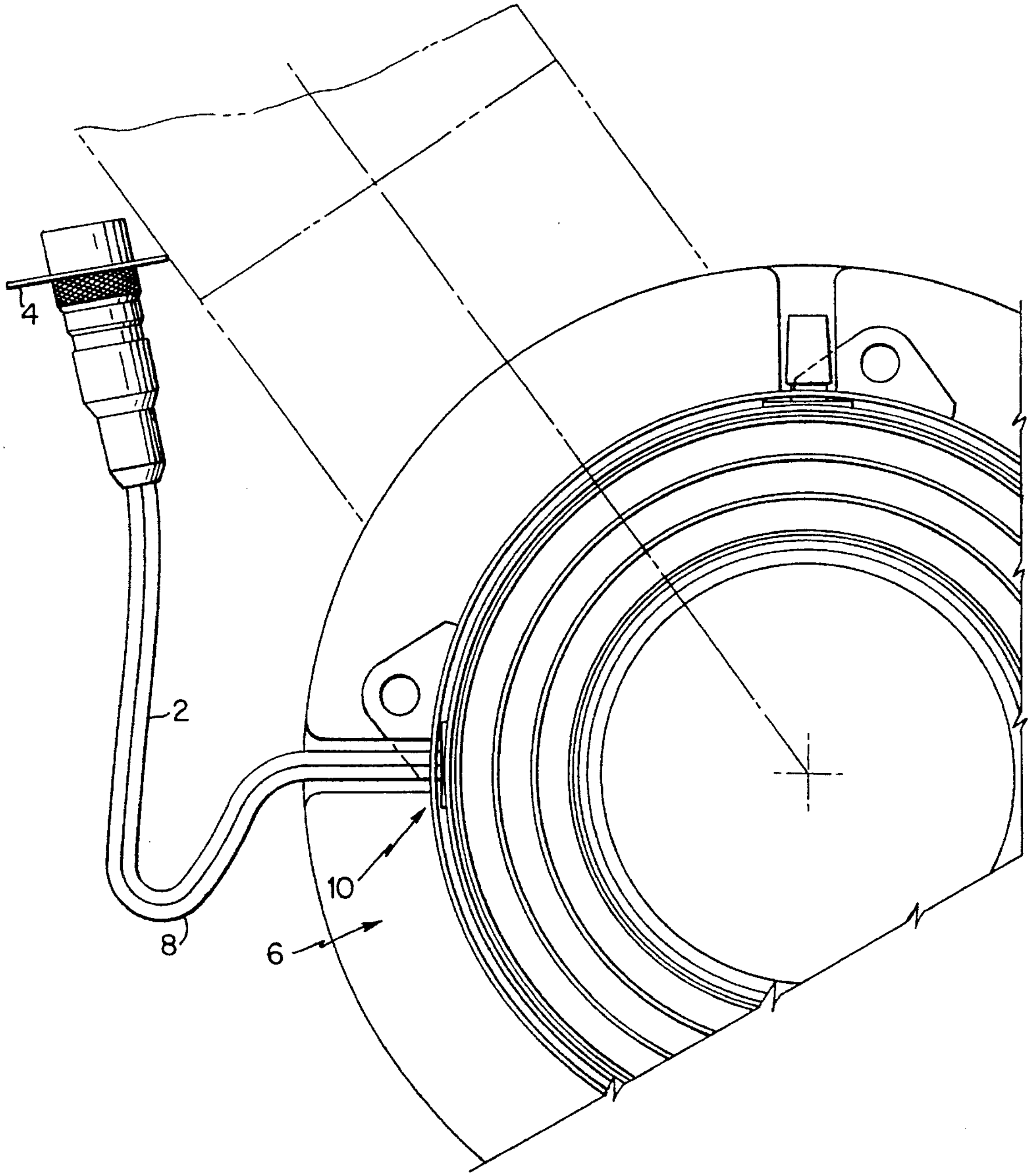
Fig. 1 PRIOR ART
FIG. 1 is a diagram of a prior art connection of an electrical cable providing current to the deicers on the blades of a tail rotor of a conventional helicopter.
Figure 3:
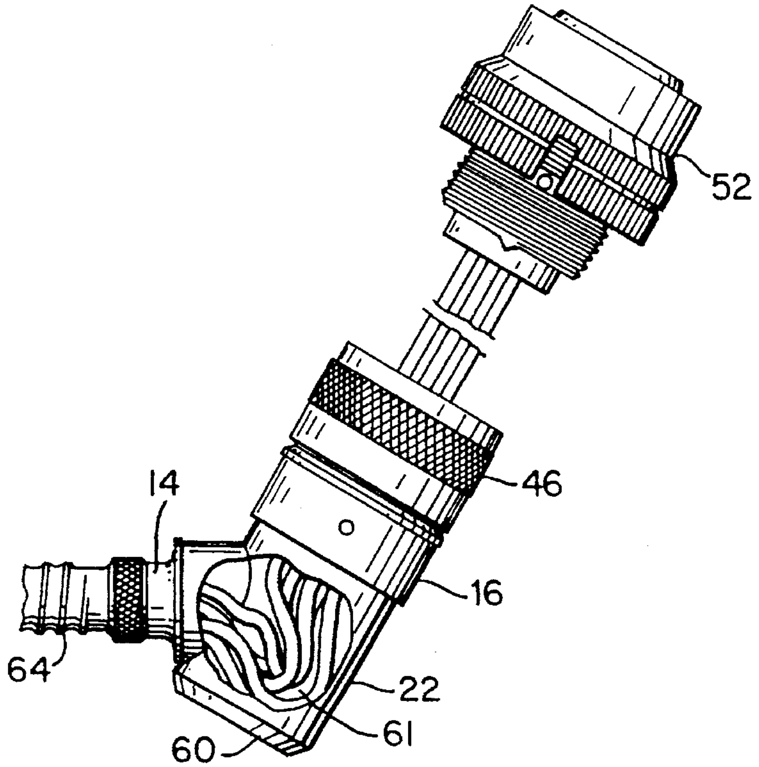
FIG. 3 is a view illustrating the lie of the cable at the junction of the sidearm and the main body of the swivel.
Figure 4:
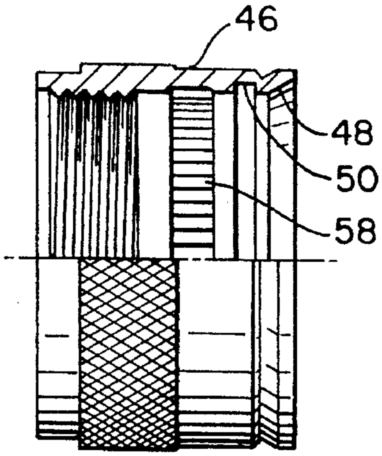
FIG. 4 illustrates the end coupling of the swivel in partial section.

The main body 12 as viewed in FIGS. 2 and 3 has a removable threaded plug 60 at its end remote from the swivel front end 16. The purpose of the plug or cap 60 is to assist in threading the cable through the swivel assembly. Cap 60 is removed and cable is fed from conduit 64 through the sidearm 18 and into the swivel main body 12. The access to the interior of the main region 22 or the main body permits assistance in turning the wires of the cable so as to be aligned with the centerline of the swivel. The cable is fed in until sufficient cable is passed through the swivel assembly to permit connection of the ends of the wires of the cable to the electrical connector 52. When all of the connections have been made, the connector is retracted toward the knurled coupling 46 so that the coupling can be threaded onto the electrical connector 52. This retraction is assisted by pulling back on the wires of the cable through the opening provided by removal of the end caps 60, some of the wire being loosely accumulated at the junction of the side arm 14 and the main region 22 of the swivel adapter body 12, a region designated by reference numeral 61. This loose accumulation of wire is maintained to accommodate twisting of the wires to permit the swivel to be quite short in length without subjecting the wires or cable to undue strain. Once the cable is set in its final position the end cap 60 is screwed back into place and assembly completed. The electrical connector can now be coupled to a mating electrical connector such as connector 66 connected in turn to an electrical lead, such as illustrated in FIG. 1.

The swivel employed is of particular advantage in the electrical connector art but may be used to relieve stresses in any cable that is subjected to severe vibration and twisting loads.

Once given the above disclosure, many other features, modifications and improvements will become apparent to the skilled artisan. Such features, modifications and improvements are, therefore, considered to be a part of this invention, the scope of which is to be determined by the following claims.

What is claimed is:

1. A swivel joint comprising a hollow main body member having a central axis, a hollow internally threaded second body member having a central axis coaxial with said main body, an externally threaded annular bearing, said main body member having a cylindrical bearing surface defined between two walls and extending toward said second body member, said annular bearing being seated on said cylindrical bearing surface bar rotation relative thereto, said second body member threaded onto said annular bearing, and means for substantially reducing the effects of side and end thrust on said second body member, said means comprising said annular bearing having dimensions substantially precisely equal to the dimensions of said bearing surface between said walls.

2. A swivel joint according to claim 1 wherein said bearing is an externally threaded split ring capable of diametrical expansion to fit over one of said walls and rotatably contact and snugly embrace said bearing surface.

3. A swivel joint according to claim 2 further comprising means for locking said second body member to said bearing.

4. A swivel joint according to claim 3 wherein said means for locking comprises a transverse passage through said second body member in alignment with the split in said bearing, and a member for being seated in said passage and extending into the split in said bearing.

5. A swivel joint according to claim 1 wherein said main body member includes a sidearm through which a cable enters said main body member at an angle to said central axis.

6. A swivel joint according to claim 5 further comprising means for assisting threading of a cable through said sidearm and said main body member, said means for assisting including an entry way into said main body adjacent the junction of said side arm and said main body, and means for securing a cable to said sidearm, said means for assisting in threading provides an accumulation of cable at an entry of said sidearm into said main body member.

7. A swivel joint according to claim 1 wherein said second body member is dimensioned such that a substantial part of the axial length of said second body member overlaps said main body member.

* * * * *